United States Patent [19]
Wally, Jr.

[11] 3,920,333
[45] Nov. 18, 1975

[54] PHOTOGRAPHIC SUBJECT HOLDER

[75] Inventor: Joseph H. Wally, Jr., Shawnee Mission, Kans.

[73] Assignee: Filminiature Systems, Inc., Kansas City, Mo.

[22] Filed: Aug. 1, 1974

[21] Appl. No.: 493,510

Related U.S. Application Data

[62] Division of Ser. No. 288,265, Sept. 12, 1972, Pat. No. 3,837,742.

[52] U.S. Cl. .................................. 355/76; 355/32
[51] Int. Cl.² ................... G03B 27/62; G03B 27/64
[58] Field of Search ............ 355/76, 75, 73, 74, 92, 355/99, 114, 125, 40, 39, 32

[56] References Cited
UNITED STATES PATENTS

| | | |
|---|---|---|
| 3,025,778 | 3/1962 | Stuckens ........................ 355/75 UX |
| 3,170,368 | 2/1965 | Barnhart ............................. 355/32 |
| 3,591,284 | 7/1971 | Liebman ............................. 355/75 |

*Primary Examiner*—Richard A. Wintercorn
*Attorney, Agent, or Firm*—Johnson, Dienner, Emrich & Wagner

[57] ABSTRACT

Apparatus including a stepping camera having a movable film platen under control of a digitally programmed indexer is disclosed for photographing images of sheet copy individually mounted in carriers and positioned by the camera subject holder on the optical axis of the objective, a different portion of the film being aligned with the camera objective for each carrier-mounted copy thus located by the subject holder causing images of the copies imposed on the film to be in a programmed sequence and arrangement, the film when processed being useful to make "imposition" printing plates in a companion projector.

6 Claims, 14 Drawing Figures

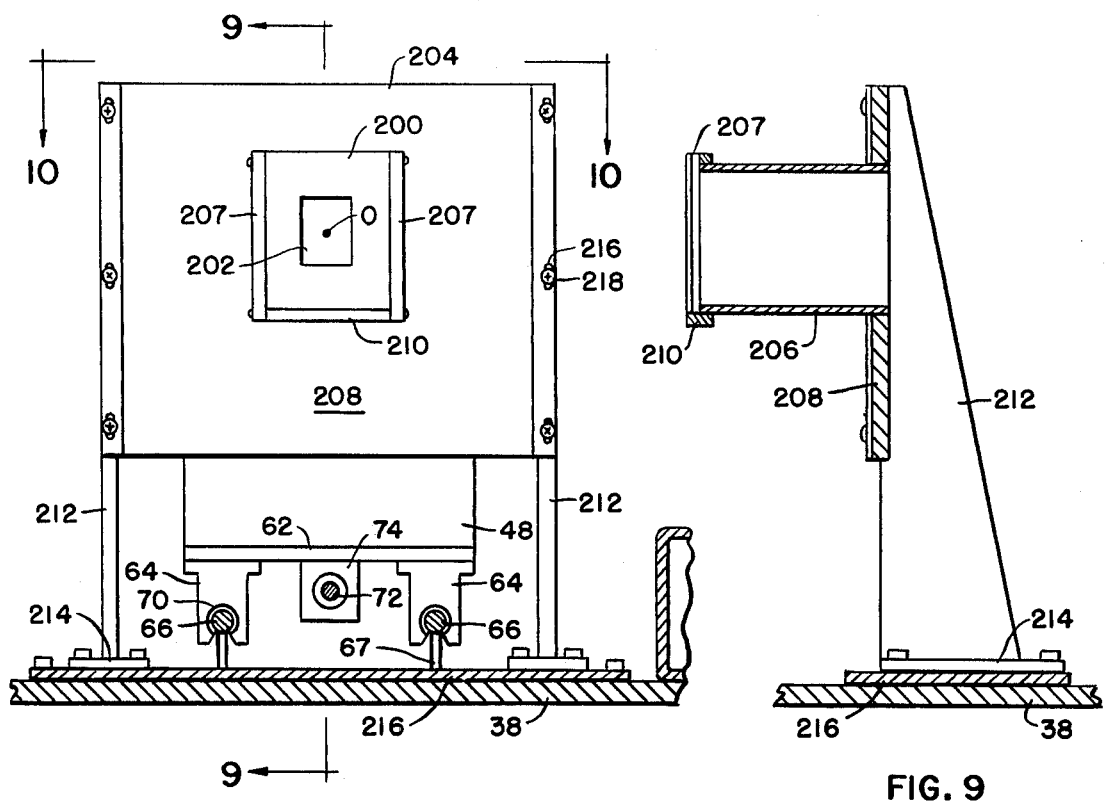
FIG. 8
FIG. 9
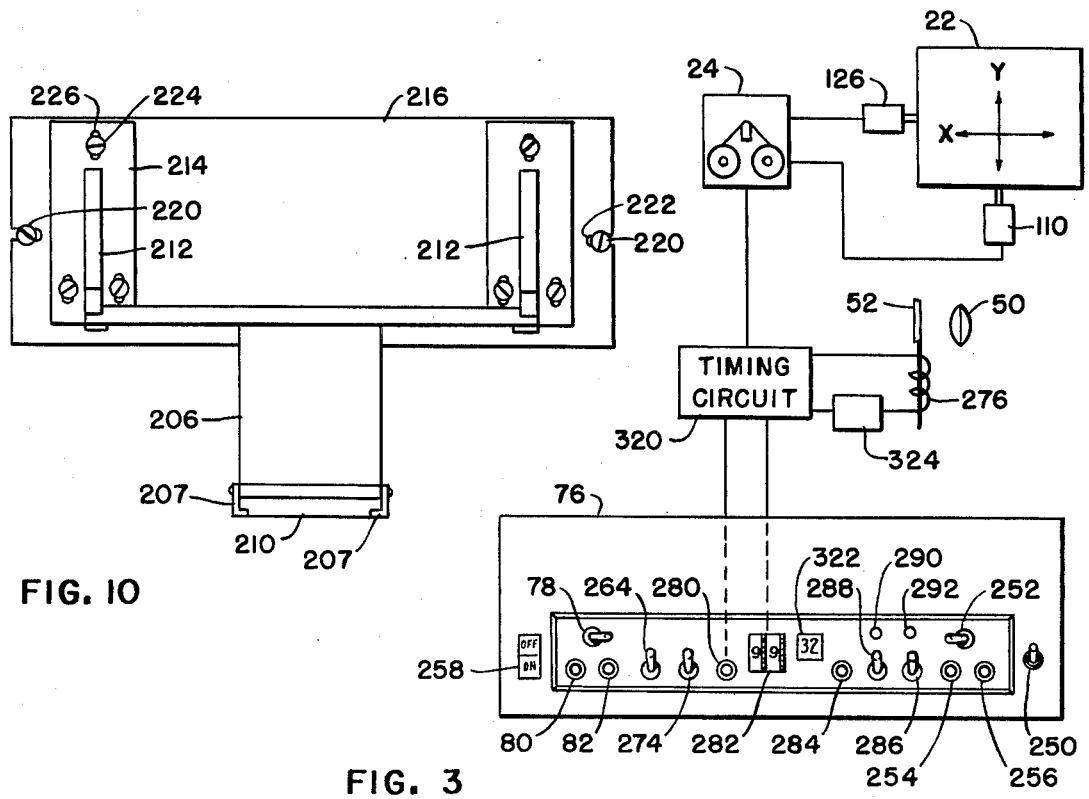
FIG. 10
FIG. 3

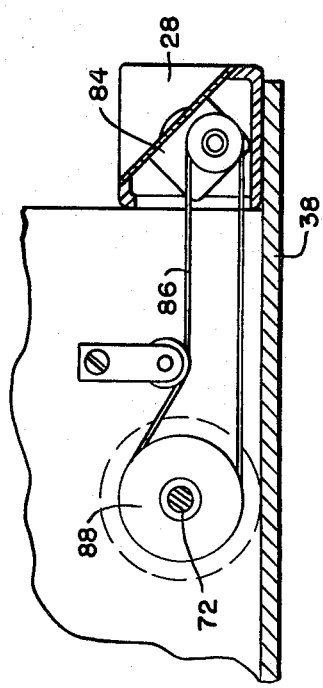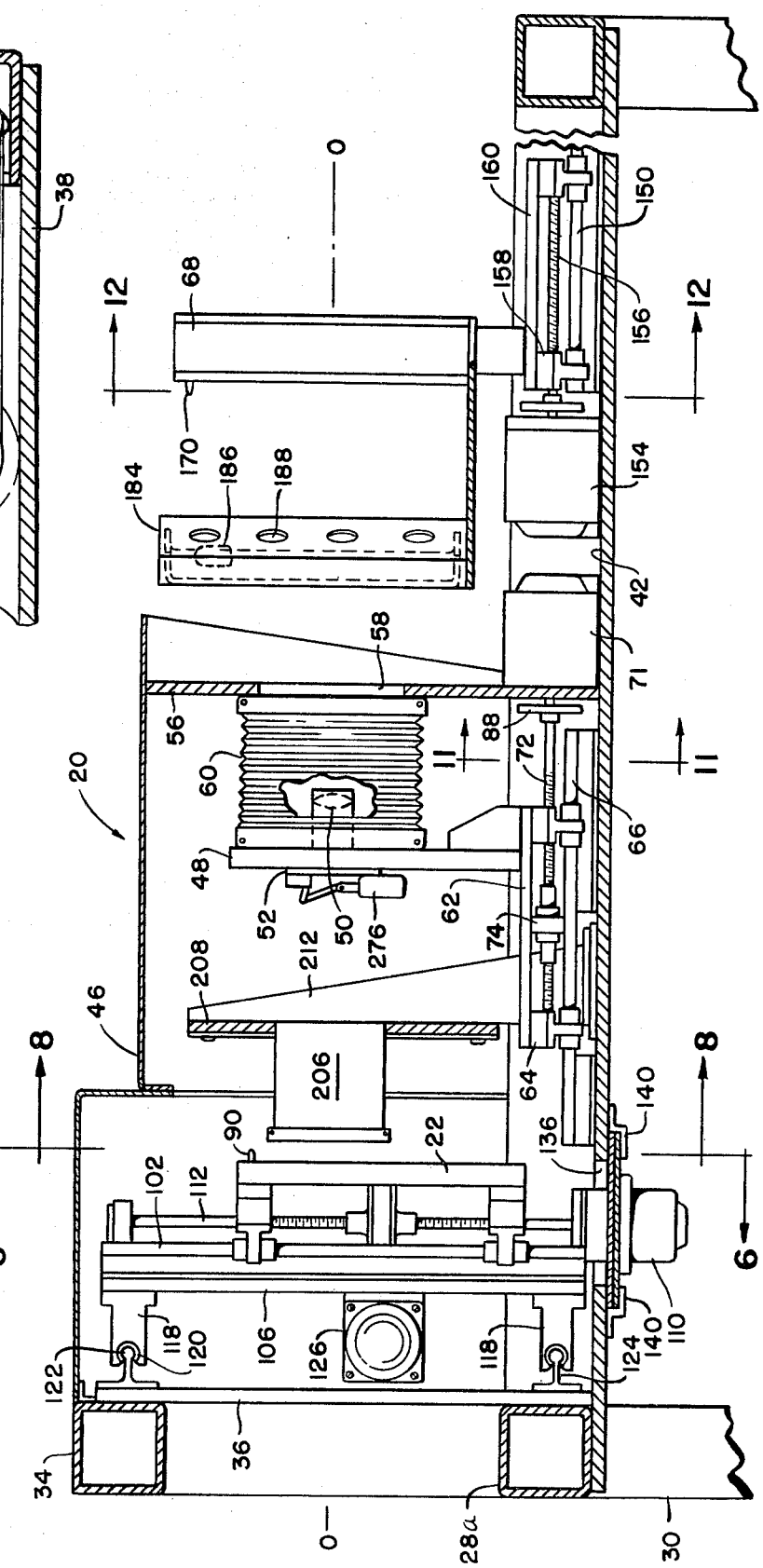

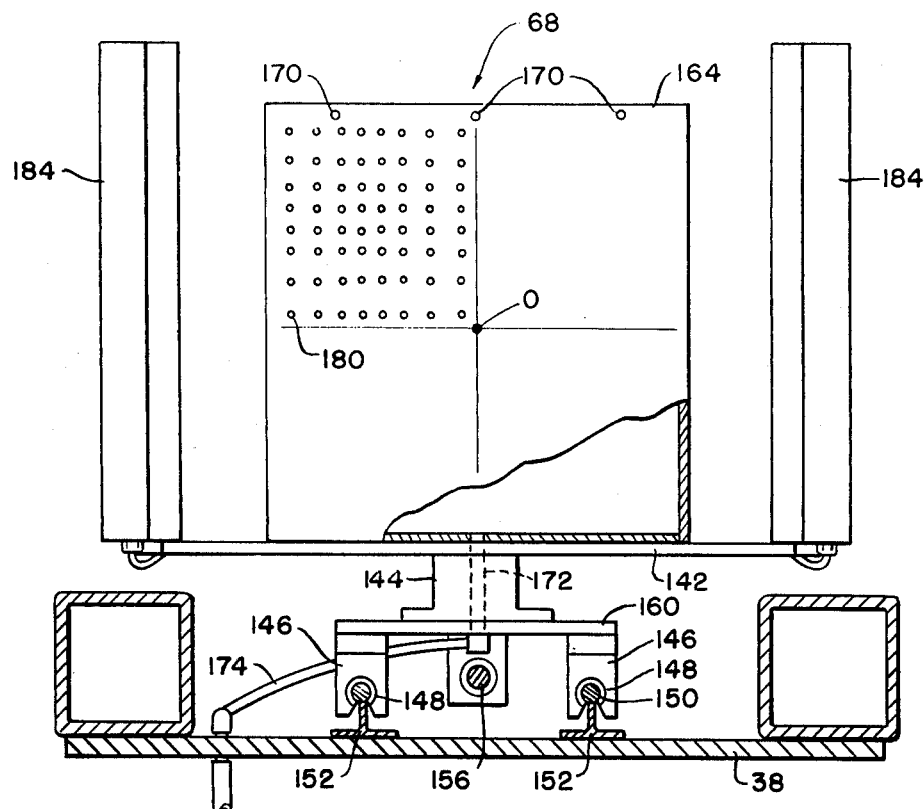
FIG. 12
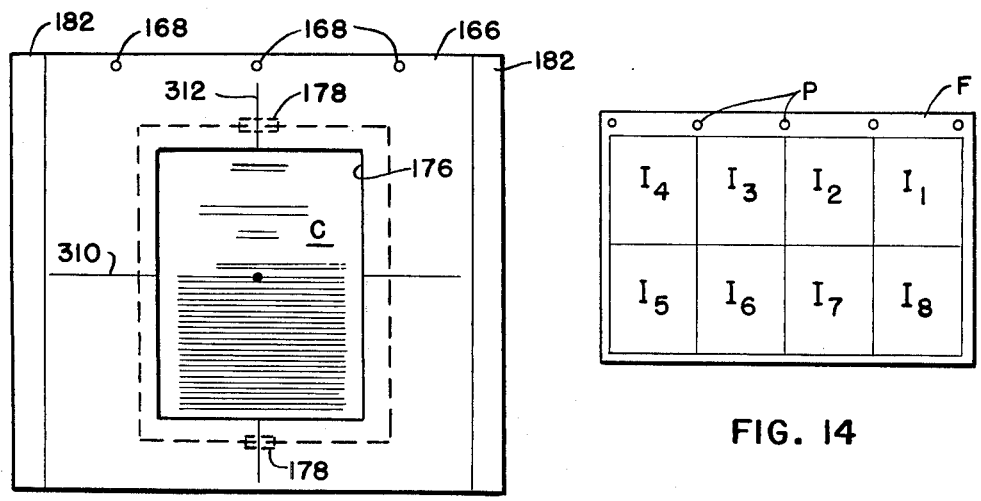
FIG. 13
FIG. 14

PHOTOGRAPHIC SUBJECT HOLDER

This is a division of application Ser. No. 288,265, filed Sept. 12, 1972, now U.S. Pat. No. 3,837,742 issued Sept. 24, 1974.

This invention relates to a novel construction of stepping camera and associated controls which comprise a system which which images of original copy are imposed in programmed rows and columns directly on the film being exposed.

The invention has particular utility to the printing industry. For example, it is common in the book printing industry to print impositions which comprise sheets having pages of a book printed in rows and columns on both sides thereof. The pages printed on the two sides of the impositions are so arranged that the sheet may be folded up and trimmed along three edges to constitute a "signature" which, when assembled with other signatures, may be bound together along the fourth edge to constitute a complete book. In the past the plates which have been used to imprint the imposition have been prepared by a contact printing technique from "flats". These flats were prepared by laying out either original pages or film images thereof in a pattern which would place them in the proper sequence when folded into signatures. The layout was usually taped together in the negative with lithographic pressure sensitive tape and covered with light blocking paper or plastic usually called "goldenrod" because of its color. Windows were then cut in the goldenrod with a sharp blade to reveal each individual page image to be printed, the goldenrod serving to mask the alleyways or gutters between the image pages to prevent imperfections from being transferred to the subsequent printing plate, leaving those imperfections within the window to be eliminated by hand through the application of a liquid opaque using a retouching brush. Because the flats are necessarily large in size, are held together in a fragile way with tape and the goldenrod is itself subject to tearing if exposed edges of the windows catch on anything, the flats have an almost lace-like character and have been regarded with particular disdain in the industry. Storing of the large sized flats has also been a considerable problem to the lithographing and publishing industries. Flats in large format lithographing, measure between 22 × 34 inches and 60 × 80 inches, and are customarily stored in deep stacks on shelving which frequently rises 12 to 15 ft. in the air. Not only is the space required for such storage expensive and non-productive, but the difficulty experienced in attempting to find flats when needed and recovering the undamaged from the stacks is almost beyond belief.

One apparatus proposed to overcome the problem of flats comprises a stepping projector which permits printing from a stack of films arranged in proper sequence. This involves placing each film by exposing an image thereof on a printing plate in its proper position, using an intense light source. Such printers provide the advantage that the user is relieved of the necessity to go through the time consuming practice of taping the many pieces of film together in accurate relationship to form a flat as aforementioned.

However, in accordance with the present invention, each of the images required for one side of an imposition can be formed in a unitary film of a size convenient for storage and handling, utilizing a camera which is so constructed that originals of each page to comprise the imposition may be separately and accurately centered on the optical axis of the camera objective and images thereof reproduced in selected locations of the film by means of a programmed film platen which is movable in both the X and Y directions. Of consequence, with the camera lens properly focused for the particular image reduction employed, the images are produced in the film in proper layout and spacing. The individual images produced in the film are also clear and sharp because they can be taken through the most corrected portion of the objective which is adjacent the optical axis thereof.

Thus, it is a feature of this invention that a single film containing all the images required of one side of the imposition and in the proper configuration or layout is produced, which film in a companion device than may be utilized by photographic techniques to make a printing plate, the process being accomplished with considerably greater precision than is common in the printing industry, also at a greater speed and at less expense and while using operators of only limited skills.

As noted, a particular feature of the invention is that the image of each page can be created in the film and in the proper position while both the original copy and image receiving portion of the film are centered on the optical axis of the lens, therefrom facilitating the production of flim images of as high quality and degree of sharpness as the correction of the lens will accommodate.

Companion thereto, a further feature of the invention is that images may be produced in a film size large enough to permit a high plateau of image perfection. The selected film size, however, may be sufficiently smaller than full image size so that the films are easy to work with and also may be easily stored without introducing problems of retrieval, at the same time being large enough to hold image detail which is usually associated with full size images previously considered essential to permit precise imposition. Thus in preferred forms of the invention, films are employed having an image area on the order of 11 × 17. One of the disadvantages of utilizing so-called microfilm (in the order of 16mm and 35mm) is the problem encountered in orienting the image at the imposition stage and at proper attitude with respect to the X and Y axes of the imposition. In such small film sizes it is also difficult to accurately orient the images in the required rows and columns with precise spacing.

A particular important feature of the invention is the employment of a stepping film platen which may be programmed to permit imposition of an infinite number of images dependent on the acceptable degree of reduction and in precisely arranged rows and columns, and to do it easily again and again.

This feature renders the invention particularly useful for the printing industry generally, including in addition to the aforementioned book printing industry, the business forms industry, the nameplate field, the printed circuit industry, the newspaper industry, the label industry, the calendar imprint industry.

In summary, the invention has utility wherever there is need for casting a precise image as large as the largest presently available lithographic plates, the sizes of which may run to approximately 60 × 80 inches or larger as when printing from projection speed offset plates or letter press plates and where image quality of sheets issuing from the press are required at or near magazine quality.

In the accomplishment of the above recited features, the invention includes a novel construction of chassis for a stepping camera which permits absolute alignment of the film holding plate at right angles to the optical axis of the objective in all its various adjustments and while maintaining parallelism with the subject holder plane. Such a camera may be also made large enough for use of a process type lens designed for graphic line and continuous tone filling of 8½ × 11 inches or smaller images at 2 to 4 diameters of reduction and a focal length of 8.25 inches wherefore a 4.25 × 5.5 inch image in the film can be projected through the most corrected portion of the lens and so as to avoid any substantial image deterioration.

Still other features of the disclosed stepping camera include its ability to precisely align the copy holding plane in all of its various positions of adjustment relative to the plane of the film holding platen so that image deterioration is minimized at all degrees of image reduction.

Still another feature of the invention is a novel construction of carrier which facilitates both the physical act of mounting the copy on the subject holder of the camera and precisely locating the copy with reference to the optical axis of the camera.

A further feature of the invention is the novel construction provided for a carrier which permits both sides of the copy mounted thereon to be photographed by reversing the mounting of the carrier on the subject holder and avoiding the need to separate and/or remount the copy.

A further feature is the novel construction of an operator's control station and its relationship to the stepping camera which facilitates loading and unloading of copy, as well as operation of the camera at different positions to which the subject holder is adjusted in accommodating image reduction requirements, and to perform tirelessly and fast.

A further feature of the invention is the novel location of the objective of the stepping camera on a movable lens board which is located within the camera housing so as to facilitate shielding the objective lens from the glare of room light and subject holder lighting without interfering with the normal functions of the camera, and while being also readily accessible for maintenance.

Still another feature of the invention is the novel construction and shape provided the film compartment which permits the operator to be stationed close to the subject holder without interfering with the functions of the stepping film platen.

Further features of the invention include the novel construction and arrangement of the drive motors for the stepping platens which facilitate the programmed adjustment of the film platen in both its X and Y axes relative to the optical axis of the camera and while avoiding interruption of the required light-tightness for the camera housing.

Still other features of the invention include the novel construction of a mask and supporting structure therefor which confines the projected light from the objective lens to the elected film portion centered therewith and avoids light fogging of surrounding or adjacent portions of the film.

Many other objects, advantages and features of the invention will be apparent at once, or will become so, upon consideration of the description of a preferred embodiment of the invention which follows.

Referring now to the drawings:

FIG. 3 (Sheet 4) is a fragmented view of the operating station illustrating the control panel on a larger scale and illustrates schematically operation of the shutter and film platen indexing means;

FIG. 5 (Sheet 2) is a vertical sectional view taken lengthwise of the stepping camera;

FIG. 8 (Sheet 4) is a sectional view taken along line 8—8 of FIG. 5 looking in the direction indicated by the arrows and illustrates details in the construction of the mask and its supporting structure;

FIG. 9 is a sectional view taken along lines 9—9 of FIG. 8; and FIG. 10 is a sectional view taken along lines 10—10 of said FIG. 8, both said figures illustrating further details in the construction of the mask;

FIG. 11 (Sheet 2) is a sectional view taken along lines 11—11 of FIG. 5;

FIG. 12 (Sheet 5) is a view taken along lines 12—12 of FIG. 5 and illustrates the subject holder;

FIG. 13 is a plan view of the sheet copy carrier by which copy is supported on the subject holder of FIG. 12 in centered relation to the optical axis of the camera; and FIG. 14 (Sheet 4) is a plan view of a film produced by the invention and useful to make the plate required to print one side of an imposition such as is utilized in the book printing industry.

Figure 1:
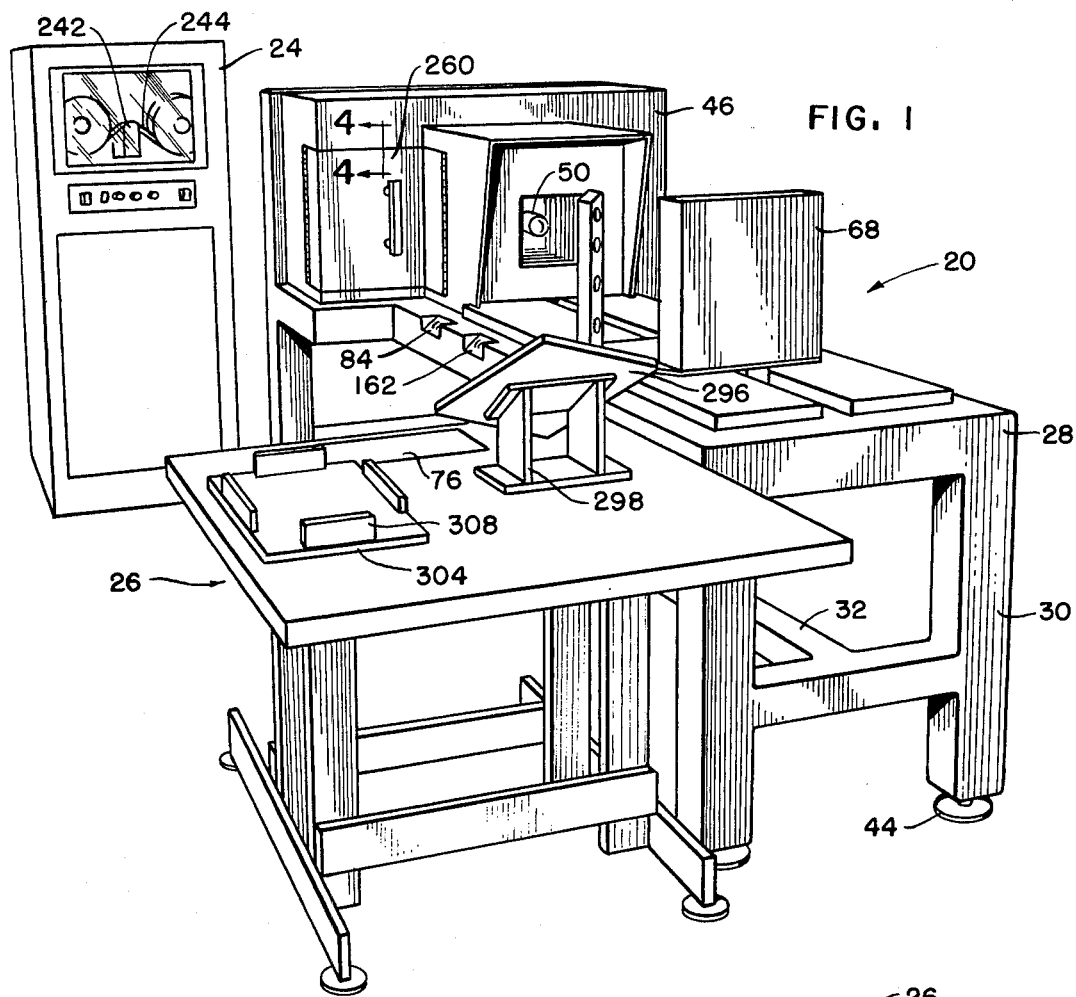
FIG. 1 illustrates a stepping camera in association with a programmed tape indexing means for the movable film platen of the camera and the camera operating station which together comprises a preferred embodiment of the invention.

Referring now more specifically to the several views, wherein like parts are identified by like reference numerals, FIG. 1 illustrates at 20 a stepping camera having a film platen 22 (FIG. 5) which is adjusted vertically and horizontally in a plane at right angles to the optical axis O-O of the camera in response to the operation of indexing means indicated generally at 24. Also, in FIG. 1, 26 illustrates an operator's station from which the stepping camera is loaded with copy and also operated to produce images of said copy on film F (FIG. 14) in precisely located rows and columns determined by indexing means 24. These images, for example, may collectively correspond to the eight pages making up one side of an imposition such as in used by the bookprinting industry.

Considering now FIG. 5 with FIG. 1, camera 20 comprises a pedestalled base frame 28 formed from squared tubular heavy steel stock assembled and butt-welded into the form of a generally horizontal frame 28 of generally T-shape in top plan with vertical legs 30 at its four corners which are reinforced by H-shaped bracing 32. Rising from the rear of the base frame 28 are a pair of uprights 42 (See FIGS. 6 and 7) which are integral and constitute vertical extension of the two rear legs 30a, 30b. These uprights are jointed by an integral cross member 34 also of squared tubular sheet steel stock. Cross member 34, vertical extensions 32 and the rear member 28a of the horizontal frame together provide perimeter support for a vertical rigid aluminum jig plate 36 which is bolted or otherwise secured thereto. Similarly bolted or otherwise securely fastened to the underside of the horizontal frame 28 is a horizontal rigid aluminum jig plate 38. Plates 36 and 38 are of sufficiently heavy gauge (i.e. the order of 1 inch) so as to resist bonding and provide unyielding support for the structure mounted thereon and have planar surfaces 40 and 42 respectively which are truly flat and mounted at exactly 90° to each other. The four legs 30 at the corners of the camera supporting base are also provided with adjustable feet 44 which permit stabilizing the camera on the floor of the room in which it is contained and also permit leveling mounting plate 38 so that its surface 42 is truly horizontal and surface 40 of plate 36 truly vertical. Enclosing one end of the base is a housing 46 which with mounting plates 36, 38 and the horizontal frame members 28 to which the housing 46 is bolted form a light tight compartment which houses the aforementioned film platen 22, the lens mounting board 48 and the objective lens 50 and a solenoid operated shutter 52 which the lens board 48 supports.

Referring particularly to FIG. 5, the forward end of housing 46 comprises a vertically disposed supporting plate 56 bolted or otherwise rigidly secured to mounting plate 38. Said plate 56 has a rectangular shaped aperture or opening 58 which is centered on the optical axis O-O of the camera with which the objective lens 50 and shutter 52 are also aligned. Surrounding said opening 58 and secured thereto and to the lens board 48 is bellows 60 within which is located the lens 50 on the outer side of the lens board where it is conveniently accessible through opening 58, but shielded by the bellows against the glare of room and other distracting light.

Considering now FIG. 8 with FIG. 5, it will be seen that the lens board 48 is mounted at right angles on a supporting base plate 62 so that it is exactly parallel with the film platen 22 and that base plate 62 in turn is mounted on parallel runners 64 which slide on a pair of similarly spaced rails 66 extending longitudinally of the optical axis O-O permit adjustment of the spatial setting of the objective 50 from the film platen surface 22 as for sharpening focus of an image of copy when mounted on the subject holder 68 as afterwards explained more in detail. Preferably rails 66 are cylindrical in shape and mounted atop T-shaped members to mounting plate 38. Slide 64, 64 wrap more than 180° about said rails 66 and engage the rails by means of linear re-circulating bearing 70 which provides essentially friction free movement along the rails 66 under the drive of motor 71 which turns a threaded screw shaft 72 to drive an internally threaded member 62 attached to the underside of the lens board supporting base plate 62. Motor 71 is preferably an A.C. synchronous stepping motor so that it resists turning of shaft 72 except when energized. Thus, in its stopped condition, motor 71 constitutes a brake for positively locating the lens board and thereby the objective lens 50 in an adjusted spatial setting to the film platen 22.

Figure 2:
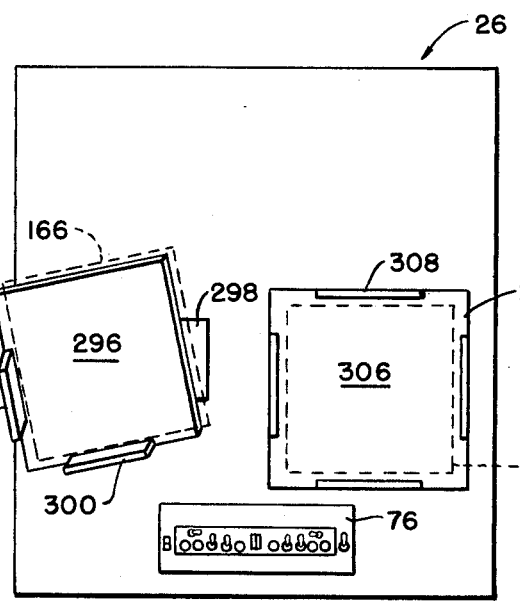
FIG. 2 is a top view of the operating station.

Referring now to FIG. 2, operating station 26 is seen to comprise a table of convenient height approximately that of the camera frame 28 or an inch or so lower. On said table at the front thereof is a control panel 76 conveniently accessible to the operator when seated in front of the station. As more clearly illustrated by FIG. 3, control panel 76 includes a master switch 78 which when closed completes a circuit to motor 72 so that it may be rotated in one direction by depressing button 80 and in the opposite direction by depressing button 82. Mounted on the camera frame 28 conveniently viewable from the operator's station is a digital indicator 84 driven by a belt 86 off a pulley 88 mounted on screw shaft 74 so that it turns therewith and indicates the spatial setting of the objective lens 50 to the film platen plane.

It is a feature of this invention that the film platen 22 and the subject holder 68 are adapted to hold the film and copy respectively in registered right angular relation to the optical axis O-O and in parallel planes. The platen is also adjustable through said plane in directions identified in FIG. 6 as X and Y and which are at right angles to each other and to the optical axis O-O to permit preselected portions of the film mounted on the platen to be centered on the optical axis of the camera. Thus, in accordance with the invention, each of the images produced in the several portions $I_1$–$I_8$ into which film F (FIG. 14) may be divided for purposes of the imposition will be produced by light rays passing through the central area of the lens 50 which is the most corrected portion thereof. Since the copy on the subject holder 68 is also centered on the optical axis of the camera, with the invention, film images of the highest quality and sharpness that the camera lens will permit are obtainable.

Figure 6:
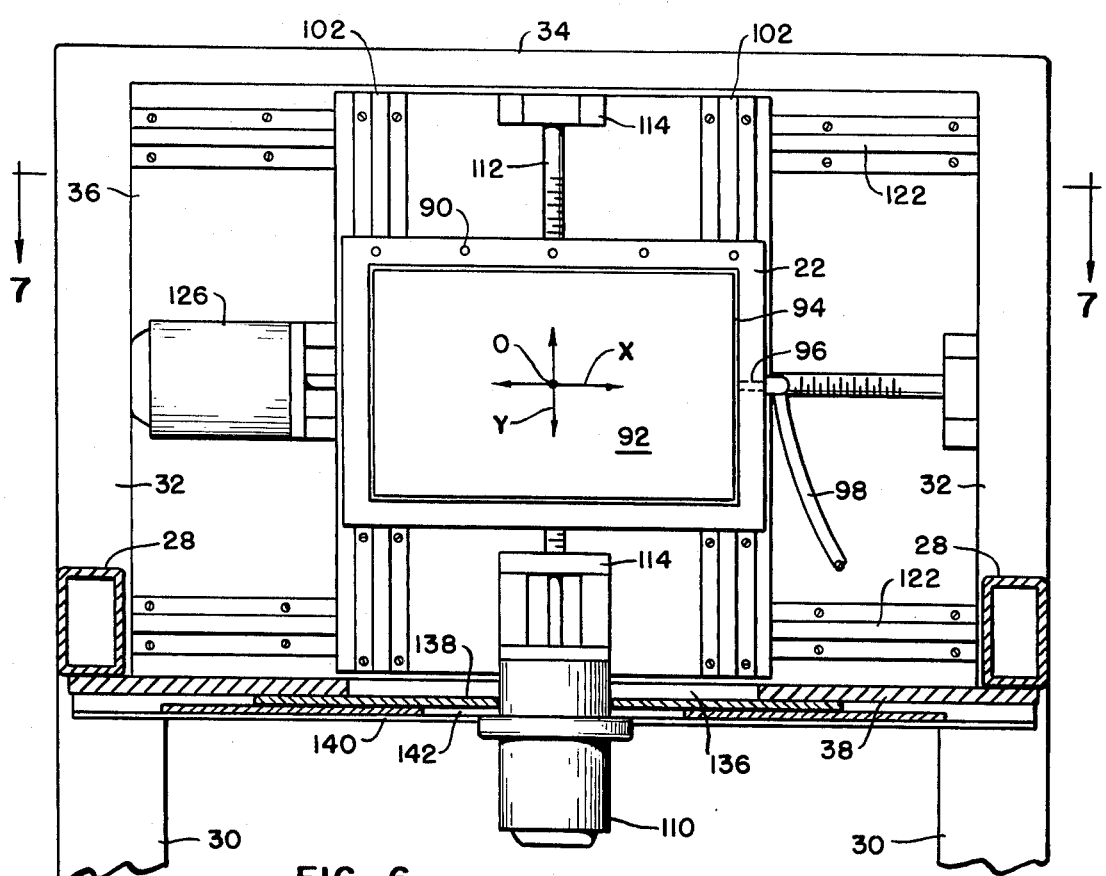
FIG. 6 (Sheet 3) is a sectional view taken along lines 6—6 of FIG. 5, looking in the direction indicated by the arrows and illustrates the movable film platen and the driving motors therefor.
Figure 7:
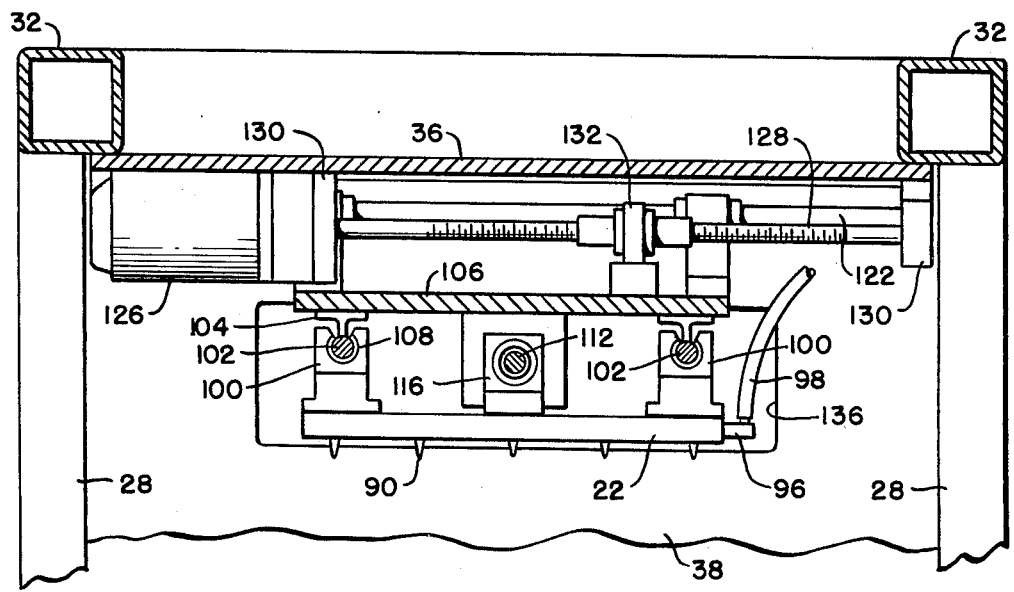
FIG. 7 (Sheet 3) is a sectional view taken along lines 7—7 of FIG. 6, looking in the direction indicated by the arrows and illustrates further details in the construction of the movable film platen and its driving mechanism.

Considering therefore FIGS. 6 and 7 with FIG. 5, film platen 22 is seen to comprise a rectangular shaped member of opaque aluminum or other rigid inflexible material along the upper edge thereof having spaced registration pins 90 corresponding in number, size and spacing to the perforations P of the film (F in FIG. 14). Thus, each film when mounted in the camera assumes the same registered relation to the optical axis O of the camera and similarly when developed and utilized in a companion projector to make the plates which print the imposition. Surface 92 of the film platen and particularly the portion thereof within the area defined by the continuous channel 94 is ground and polished to a high degree of flatness. As illustrated in FIG. 6, continuous channel 94 is connected by a port and fitting 96 to conduit 98 which leads to a vacuum source not illustrated. Thus, each film when located on the platen 22 is registered by the pins 90 and is also drawn flat against the surface 92 so that its photosensitive coating assumes a planar configuration at right angles to the camera axis O-O.

As already suggested, it is contemplated that images of copy supported on the subject holder 68 will be reproduced in selected portions of the film F which images will be precisely arranged in rows and columns and accurately spaced to meet the requirements of an imposition as discussed above and, for example, as illustrated at $I_1$–$I_8$ in FIG. 14. Thus in said FIG. 14, film F is illustrated as having two horizontal rows of images I, each row containing four images so that the film also may be characterized as containing two rows and four columns of images. It will be understood, however, that the invention is also useful to produce any other number of rows and columns of images to satisfy specific requirements, the only limitation being that of acceptable image size and spacing on the film F. Thus, the invention includes means such that each of these images may be precisely located on the film, and in any programmed number of rows and columns, limited only by the image reduction capacity of the camera and the image quality acceptable within the limitations of the camera lens itself. To this end, as illustrated in said FIGS. 5, 6 and 7, the film platen 22 is provided with spaced parallel runners 100 on its rear side which slidingly engage and wrap more than 180° about cylindrical rails 102 which extend in parallel relation at right angles to axis O-O and are supported vertically by T-shaped structures 104 to mounting plate 106. Runners 100 also have engagement with rails 102 by means of linear re-circulating bearings 108 which provide nearly friction free vertical sliding movement of the platen 22 relative to the mounting plate 106. Vertical adjustment of the platen 22 along said rails 102 obtains through operation of a first synchronous stepping motor 110 which rotates a threaded shaft 112 supported in bearings 114 and has threaded engagement in member 116 secured to the rear side of the platen 22. Thus, it will be appreciated that in accordance with the direction in which motor 110 is operated, shaft 112 may be turned clockwise or counterclockwise so as to effect vertical movement of the platen either upwardly or downwardly a distance determined by the pitch of the thread turns on shaft 112 and the number of turns the shaft is rotated. As perhaps seen best in FIG. 7, when considered with FIG. 5, mounting plate 106 is provided with similar runners 118 which through similar linear re-circulating bearings 120 engage about and have free sliding contact with horizontally spaced extending parallel spaced cylindrical rails 122 also supported on the ends of T-shaped mounting structures 124 which, in turn, are secured to the vertical mounting plate 36 of the camera. A second stepping motor 126 is secured to said mounting plate 36 and so as to rotate a horizontally extending threaded shaft 128 which is supported in end bearings 130 and has threaded connection with a member 132 secured to the rear side of the mounting plate 106. Thus, rotation of motor 126 causes the film platen 122 to move laterally of axis O-O in a horizontal direction at right angles to the direction of movement of the film platen obtained by operation of motor 110. Since motor 110 must be free to move with platen 22 when driven by motor 126, motor 110 extends through a laterally extending slot 136 in the horizontal mounting plate 38 as illustrated by FIGS. 5 and 6 which slot is wide enough to conveniently receive the motor and long enough as not to inhibit the lateral movement of the platen which must be sufficient to permit centering the full horizontal extent of the film when supported thereon. Since the housing in which the film platen moves also must be light-tight, motor 110 is fixed in the upper one 138 of a pair of slide panels 138, 140 which cover said slot, said panels 138, 140 being slidably supported on the underside of mounting plate 38 by channel members 140. The lower one 140 of said sliding panels, however, includes an elongated slot 142 through which the lower end of motor 110 protrudes. However, the lengths of the two panels 138, 140 are selected so that as the motor moves with the platen to the left or to the right and reaches the limit of the slot 142 in the bottom panel 140, the bottom panel 140 moves therewith but not so far as to expose the slot 136 through the horizontal base plate 38. Therefore in all positions of adjustment of the platen the housing 46 remains light-tight.

Considering now FIG. 12 with FIG. 5, the subject holder of the present invention which is illustrated at 68 comprises a hollow closed rectangular member supported on a base plate 142 by structure indicated generally at 144. Such structure includes a pair of runners 146 which engage about a pair of cylindrical rails 150 extending in spaced parallel relation longitudinally of the camera and parallel to the axis O-O and have free sliding engagement therewith by linear recirculating bearings 148. Rails 150 are supported in this aligned relation on T-shaped structure 152 welded or otherwise secured to the horizontal mounting base plate 38. Means are also provided for moving the subject holder 68 on said rails toward and away from the film platen 22 and objective lens 50 in a direction paralleling the camera axis O-O to determinable spatial settings providing a required image reduction. Such means comprise a second motor 154 secured to the mounting horizontal base plate 38 which turns a threaded shaft 156 having threaded connection with member 158 supported beneath the subject holder mount 144. As illustrated in FIG. 1, a second indicator 162 is mounted on the camera frame 28 adjacent indicator 84 to digitally indicate the spatial setting of the subject holder of the film platen, the indicator being driven by the rotation of shaft 156 through a pulley and belt arrangement such as illustrated in FIG. 11 which drives indicator 84. Referring now to FIG. 12, face 164 of the subject holder 68 facing the film platen on which copy is mounted is ground and polished or otherwise formed to a high degree of flatness so as to define a plane parallel to the plane of the film platen 22 and at right angles to the optical axis O-O in all of its adjustments axially of the camera along rails 150.

Although the sheet copy may be directly mounted on the subject holder face 164 by tape and/or use of registration pins 170, a feature of this invention is that the sheets C of copy material are individually mounted on carriers 166, one of which is illustrated in FIG. 13. As there shown, carrier 166 is provided with spaced perforations 168, preferably three in number, these perforations being spaced and sized so as to fit over the similarly sized and spaced registration pins 170 provided along the top edge of the perforated wall 164 of the subject holder 68. As illustrated in FIG. 13, carrier 166 includes an opening 176, usually rectangular, although it can be of any other shape, which is centered on the carrier so that when mounted on the subject holder, the opening also centers on the camera axis O-O. The dimensions of opening 176 are preferably selected so that they are less than the corresponding dimensions of the copy to be mounted thereon allowing the sides of the copy to lap the carrier so that it may be attached thereto as by suitable transparent adhesive tape pieces 178. Obviously, however, opening 176 will be larger than the subject material thereon of which an image is to be photographed.

The interior of the subject holder 68 is also connected via fitting 172 to a conduit 174 which leads through the horizontal base plate 38 to a second air evacuating source so that when the carrier 166 with its copy C is mounted over the surface 164 in a registered relation to the optical axis O-O of the camera by means of registration pins 170 to the carrier 166, including its copy, is drawn tightly against the surface of member 164.

Referring now back to FIG. 12, the perforations 180 in the wall 164 of the subject holder are illustrated as arranged in quadrants, the perforations closer to the perimeter of each quadrant being more widely spaced then the perforations nearer the center of the quadrants. The thus more closely spaced collection of perforations in the center of the four quadrants making up the subject holder face 164 correspond to the four corners of the opening 176 in the carrier 166 when mounted on the subject holder by the registration pins 170, whereas the more widely spaced perforations near the outside of the subject holder therefore underlie the carrier 166 and the more remotely spaced openings or perforations 180 at the center of the subject holder back the copy. Although perforations 180 could be uniformly spaced over the area of the subject holder face 164, it has been found that by increasing the concentration of perforations in those areas which underlie the edges of the copy the vacuum in drawing both the carrier 166 and its copy C to the flat surface of the subject holder is more effective. It will be further appreciated that the concentration of perforations is preferably spread over an area in the center of each quadrant great enough to accommodate a range of copy openings 176 in carriers 166 and to accommodate carriers in which the rectangular copy opening is horizontal as well as vertical. Thus it is contemplated that copy may be rotated about the camera axis O-O to impose the images on film F horizontally or vertically as the imposition may require and with the top of the copy in any of four primary dispositions so that each pair of pages can be provided in a head to head relationship in the total imposition as required by the publishing industry. For this reason the subject holder face 164 is preferably square. However, as illustrated, the lateral dimensions of the carriers 166 are preferably greater than the lateral dimension of the subject holder 164 so that portions 182 of the carrier may extend beyond the subject holder face when registered thereon by pins 170. These portions 182 constitute tabs for the convenience of the operator as when mounting a carrier on the subject holder to locate its perforations 168 over the receiving registration pins 170 of the subject holder. Tabs 182 also make it convenient for the operator to dismount the carrier from the subject holder without having to place a fingernail beneath the edge of the carrier to break the resistance of the vacuum pull through the subject holder perforations 180. The carriers 166 may be made of any suitable plastic or paper which is sufficiently flexible to be drawn tightly against the subject holder surface 164 under the pull of the evacuating source through the perforations 180, yet having sufficient body and rigidity so as to be shape retaining as when being transported between the operator's station 26 and the subject holder 68.

As illustrated by FIGS. 12 and 5, mounting plate 142 which supports the subject holder 68 also provides supports for a pair of uprights 184 disposed outwardly and spaced from the front wall 164 of the subject holder. Each of these uprights 184 contain a series of vertically spaced point source lights 186, one of which is illustrated by dotted lines in FIG. 5. These lamps are so mounted as to direct their light rays through provided openings 188 onto selected portions of the copy to fully and uniformly illuminate the same during operation of the camera. Preferably the upper and lower ends of the hollow supports 84 are left open to provide ventilation and avoid heat build up within the supports.

A further feature of the invention is the provision of masking means within the housing which surround the path of light rays from the lens 50 to the film portion I aligned therewith so as to prevent light spill over and undesired light exposure of adjacent image portions of the film, thereby promoting the sharpest possible images in the developed film.

Considering therefore FIGS. 8, 9 and 10 with FIG. 5, such masking means is indicated generally at 200 as comprising an opaque rectangular member provided with a central opening 202, member 200 being supported on structure indicated generally at 204 so that its opening 202 is centered on axis O-O of the camera. It will be understood that mask 200 is supported as close as possible to the film platen, but not so close as to interfere with the positioning of the platen 22 and/or its removal therefrom. For this purpose, the mask and its supporting structure should be no closer to the film platen than the protruding dimension of the registration pins 90 and in practice a ⅝ inch separation has been observed. It also will be understood that the size of the opening 202 of the mask must be large enough to permit the full diameter of the light rays emitted by the lens 50 which are necessary to project the copy image onto the portion of the film centered by the film platen on axis O-O but should be substantially no larger; and in any event opening 202 should not be so large as to permit light rays to illuminate adjacent portions of the film. Supporting structure 204 as illustrated by FIGS. 5 and 8–10 comprises a rectangular shaped box 206 which is open at both ends and is supported at one end about the aperture of an upright plate 208 so that it is centered on the optical axis O-O. The opposite end of box 206 which is closest to the film platen is provided with a pair of channel members 207 into which opposed edges of the mask 200 slidingly fit. A suitable stop is provided at 210 which limits and thereby locates the mask in its required centered relation. Plate 208 is supported by upright pieces 212 having flanged portions 214 bolted to a plate 216 which is in turn bolted to the horizontal base plate 38. As illustrated in FIG. 8, supporting plate 208 terminates short of horizontal base plate 38 so as to leave space between supporting pieces 212 for rails 66 and the lens board mounting plate 62 which said pieces 212 straddle. Advantageously, as illustrated in FIG. 8, the openings 216 in mounting plate 208 through which bolts 218 pass to secure plate 208 to the side pieces 212 are vertically elongated to provide for vertical adjustment of the mask supporting box 206. Also, as seen in FIG. 10, bolts 220 which secure mounting plate 216 to the horizontal base plate 38 pass through laterally elongated slots 222 in said mounting plate 216 to permit lateral adjustment of the mask supporting box 206. In addition, bolts 224 pass through axially elongated openings 226 in the flange portions 214 of the pieces 212 to accommodate axial movement of the mask mounting unit whereby the opening 202 of the mask may be properly centered on the optical axis of the camera and at the appropriate distance or separation from the film platen 22.

It is a feature of this invention that the movements of the film platen 22 which center selected portions thereof on the optical axis of the camera may be programmed through suitable indexing means illustrated generally at 24 in FIG. 1 to comprise an arrangement of images in any desired number of rows and columns. For this purpose, motors 110 and 126 which drive the platen along its axes X and Y preferably comprise synchronous stepping motors of the type which are pulse actuated so that for each change in energization directed thereto by the indexing means 24 they turn a controlled increment, for example 1.8°. Therefore, in such example, to move the film platen a distance equal to one pitch of the the thread on its associated shaft the motor must be pulsed 200 times. Such motors not only permit precise location of the film platen in an almost infinite number of rows and columns within the limitations of the optics of the camera itself, but also facilitate the precise centering of each portion on the optical axis of the camera and within an exceedingly close tolerance of which, for example, may be in the order of 0.001 inches. Motors of the type which are capable of being so operated are available from the Superior Electric Company, Bristol, Conn., under the designation Slo-Syn Synchronous/Stepping Motor x1500 and are more fully disclosed in U.S. Pat. No. Re. 25,445 to which reference may be had for an understanding thereof. In accordance with the invention, indexing means 24 which operates film platen driving motors 110 and 126 is a computer machine which exercises control of said motors through information stored for example on magnetic tape, punched tape or cards etc. One such digitally programmed servo-control system is more particularly described and explained in U.S. Pat. No. 3,466,515 assigned to the Superior Electric Company, Bristol, Conn., who are also the assignees of the U.S. Pat. No. Re. 25,445. As there described such a servo-control system includes an oscillator which in accordance with information stored on tape 224 read by a reader 242 feeds the recorded number of pulses simultaneously to a motor control and to a counting means. The motor control energizes either motor 110, 126 or both as the case may be, the motor turning one increment (in the example 1.8°) for each pulse received by the motor. Simultaneously, the counting means counts the pulses and stops the oscillator when the number of pulses supplied equals the number of steps in the information recorded on the tape for each of motors 126 and 110.

Figure 4:
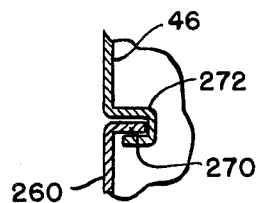
FIG. 4 (Sheet 1) is a sectional view taken along lines 4—4 of FIG. 1 looking in the direction indicated by the arrows.

Considering therefrom FIG. 1, together with FIGS. 2 and 3, it will be understood that in the normal operation of the disclosed apparatus the operator will be seated in a provided chair behind his station represented by table 26 and with the stepping camera 20 to his left, table 26 having been moved lengthwise of the camera 20 to where the operator can conveniently load and unload carriers from the subject holder 68 as well as operate the switches on the control panel 76 and observe the apparatus generally. To illustrate operation of the apparatus, it will be considered as being used to produce a film from which a printing plate may be made to produce an imposition having two horizontal rows with four vertical columns, as for example film F illustrated in FIG. 14. First its operator might load the indexer 24 with tape 244 which has been properly programmed to center each of images $I_1$ through $I_8$ of film F centered on the film platen 22 in the sequence and pattern illustrated by FIG. 14. Next the operator might adjust the spacing of the subject holder 68 to locate it at a distance from the film platen which would give the required degrees of reduction for such a particular arrangement of images. Before doing so, he would have to turn on master switch 250 as well as operating switch 252 which energizes motor 154 for the subject holder adjustment. Thereafter, by depressing either button 254 or 256, depending on the direction required to relocate the subject holder at the desired spatial setting, he would feed pulses to the motor by maintaining the button 254 or 256 in a depressed state until indicator 162 indicated numerically the proper spatial setting which he would ascertain from provided instructions. Next, he might operate switch 78 to energize motor 71 which he would then turn clockwise or counterclockwise by depressing either of buttons 80 or 82 until, on viewing indicator 84, he noted that the lens has been properly positioned for best focus at the particular reduction setting of the subject holder 68. At this stage he might then load the camera with film after having depressed button 258 to turn off the room lights and after actuating shutter switch 274 to assure that it was in a closed condition. To load the camera, the operator first pulls on door 260 of the housing 46 and if necessary he also opens door 262 to provide maximum working area. In the darkened room he would then remove an unexposed film F from its storage area and insert it into the housing 46, being sure to locate its perforations P over the registration pins 90 of the platen, having first operated switch 264 to start the vacuum pump connected to the film platen channel 24. The film is automatically registered by the pins and drawn flat against the surface of the platen by the pull of the vacuum through channel 94 underlies the film margin. The two doors are then closed before again turning on the room lights. It will be understood that suitable means are provided to assure a light-tight seal about the door edges. For example, as illustrated by FIG. 4, each of the doors 260, 262 may be provided with a lip portion 270 about all sides which seats within a provided recess 272 in the housing wall 46 around the respective door openings. Thereafter, as soon as timer 282 has been set for the required period of exposure by pressing button 284, the apparatus is ready except for illuminating the subject holder which is obtained by actuating switch 288. Buttons 290 and 292 are provided to permit temporary control of the lights or the vacuum pull on the subject holder.

The apparatus is then ready for photographing copy pieces which are to be reproduced in the film and eventually in the plates which prints the imposition. As illustrated by FIGS. 1 and 2, on the operator's table 26 are a pair of receptacles, the first of which is indicated at 294 and serves to store the required number of carriers, in this instance eight, which have been stacked according to the copy mounted thereon in a sequence corresponding to the sequence in which they are to be photographed and the programmed movement of the film platen which the selected tape 244 provides.

As illustrated in FIG. 2, the container 294 comprises an inclined base plate 296 supported on a pedestal 298 such that its lower left hand corner 298 closest to the stepping camera is lower than its other four corners and the stack of carriers is retained on base 296 by walls 300 and 302 along the left hand and lower edges of the base. Base 296 preferably is also similar in width and length than the carriers so that portions of the carrier protrude beyond the other two edges of base 298 making it convenient for the operator to grasp the top carrier of the stack by its right hand tab 182 and carry it to the subject holder, fixing its perforations 168 over registration pins 170. The operator's station or table 26 also includes a second receptacle indicated at 304 having a base 306 which sets flat on the table surface and has walls 308 along its four walls which together define an area both of whose dimensions are substantially greater than that of the carriers. This receptacle 304 receives each of the carriers after they have been removed from the subject holder and will be place in the receptacle with their side down reverse to that when stacked in receptacle 294. Receptacle 304 being oversized, the carrier can be readily dropped into it without regard to arrangement and after all eight carriers of stack 294 have been shot, the stack of carriers in container 304 can be straightened out and replaced in container 294 in said reverse order and used to produce images on a second film which will then have images properly arranged and spaced so as to be useful to prepare the plate which prints the second side of the imposition. Therefore, assuming the two printing plates to be identically registered, the pages of the printed impositions when folded into signatures and assembled will have the same margins and be otherwise equal.

To photograph the copy and properly locate the images of each copy on film F, the operator having set up the camera as already described, needs only to depress trigger 280 after he has located each carrier on the subject holder. As illustrated in FIG. 3, by depressing trigger 280 a timing circuit illustrated diagrammatically at 320 is energized, which first operates a switch to close the solenoid circuit 276 to open shutter 52 and effect exposure of an image of the copy on film F in the portion thereof centered by the film platen 22 on axis O-O. It will be understood that timing circuit 320 is of conventional construction and operates to energize the shutter solenoid circuit 276 so as to hold open shutter 52 for the time interval set by timer 282. The subject holder lights 186 are also controlled by means 324 in the shutter solenoid circuit so that the subject copy is illuminated during the interval that the shutter is open. If desired, the shutter solenoid circuit may contain a lamp in the control panel which is illuminated during the exposure interval as a visual indicator to the operator. At the end of the timing cycle, the solenoid relay circuit 276 opens to close the shutter, deenergize lamps 186, and simultaneously feed a pulse to the indexer 24 energizing the same so that the tape 244 starts to move past the reader 242 and signals motors 110 and 126 to move the platen to center the next portion of the film on axis O-O of the camera. As soon as this is accomplished the indexer 24 shuts down until retriggered. Simultaneously, counter 322 on the control board 76 is energized on signal from the indexer to visually indicate to the operator the number of completed exposures, the same being illustrated by the diodes of the counter device. During the interval that the indexer 24 is operating the platen drive motors 110 and 126 to recenter the platen, (as soon as the subject holder illuminating lamps 86 turn off) the operator can remove the carrier from the subject holder, place it in container 304, take the next carrier from container 294 and register it on the subject holder. Thereafter, as soon as the platen is in its new position the operator may repeat the process by depressing trigger 280 to produce an image of the copy newly placed on the subject holder.

Although the appartus has thus far been described as being utilized in preparing films for use in making plates from which the two sides of an imposition are to be printed, it will be understood that the appartus has utility wherever it is necessary or desirable to produce a unitary film having more than one image thereon and particularly where it is important to have several images precisely arranged and spaced on the film. For example, other uses of the apparatus would be to prepare printing plates for the label industry, the calendar imprint industry, the printed circuit industry and the lithographic industry in general.

It will be further understood that the above described embodiments are to be considered only as preferable and that many changes and/or modifications and rearrangements of the described parts may be had and are intended to be included within the spirit of the invention as specifically defined by the claim hereto appended.

Thus having described my invention, I claim:

1. In a camera, a rectangular shaped subject holder including a perforated board connected to an air evacuating source having spaced registration pins adjacent one edge thereof and a sheet-like flexible carrier member having mounting apertures along one edge spaced to receive the registration pins of the subject holder, said carrier having a central opening over which copy to be photographed may be fixed, the center of said opening in the carrier being related to the mounting apertures thereof such that when mounted on the subject holder by means of its registration pins the copy is centered by the carrier on the optical axis of the objective lens of the camera, the lateral dimensions of said carrier being greater than the corresponding dimensions of the subject holder such that a portion of the carrier lengthwise of at least one side of the carrier protrudes beyond the perforated board and is useful for grasping by the operator in mounting and dismounting the carrier from the subject holder.

2. The combination of claim 1 wherein the subject holder is essentially square in shape.

3. In combination, an essentially square-shaped subject holder including a perforated board connected to an air evacuating source, the perforations thereof being arranged in a pattern divisible into equal sized square quadrants, in each of which quadrants the perforations are concentrated through the center area and are more widely spaced around the perimeter of the quadrant, said perforated board having spaced registration pins adjacent one edge thereof and a sheet-like flexible member having mounting holes along one edge spaced to receive the registration pins of the subject holder, said carrier having a central opening over which copy to be photographed may be fixed, the center of said opening in the carrier being related to the mounting holes thereof such that when mounted on the subject holder the copy is centered by the carrier on the subject holder, and the lateral dimensions of said carrier being greater than the corresponding dimensions of the subject holder such that a portion of the carrier lengthwise of at least one side of the carrier protrudes beyond the subject holder and is useful for grasping by the operator in mounting and dismounting the carrier from the subject holder.

4. A carrier useful for mounting sheet copy on the vacuum subject holder of a camera having registration pins along one edge, the carrier comprising a flexible sheet-like member having an opening over which copy to be photographed is fixed, the opening being smaller in its two dimensions than the copy but larger than the portion of the copy comprising the image to be photographed, said carrier further having mounting apertures along one edge spaced to receive the registration pins of the subject holder, and the lateral dimension of said carrier being greater than the corresponding dimension of the subject holder providing a projecting tab along at least one side of the carrier by which it may be grasped for mounting and dismounting from the subject holder.

5. A carrier as claimed in claim 4 wherein the carrier further includes vertical and horizontal reference lines on at least one side thereof which reference the intersection of the camera optical axis when the carrier is mounted on the subject holder of the camera.

6. In combination, a rectangular-shaped subject holder for supporting smaller-sized copy flat and in centered relation to the optical axis of a camera in which the subject holder is utilized, the subject holder including a board having a flat copy mounting side containing closely spaced perforations arranged in a pattern divisible into equal-sized rectangular quadrants about the center of said board and connected to an air evacuating source, and a sheet-like flexible member, the outer dimensions of which are no less than those of the board, said flexible member having a central opening therethrough for locating copy on the subject holder to be photographed, the dimensions of said central opening being smaller than the copy to be photographed, and registration pins protruding from the copy receiving side of the board at predetermined intervals from each other and the center of the board, the flexible member having locating holes correspondingly spaced as the pins from each other and from the center of the central opening therein to receive said registration pins such that the copy is fixed over said opening of the flexible member and is held flat against and centered on the board.

* * * * *